Dec. 1, 1964 WAY DONG WOO 3,159,840
PATTERN SENSITIVITY COMPENSATION IN HIGH PULSE DENSITY RECORDING
Filed Nov. 14, 1960 2 Sheets-Sheet 1

INVENTOR.
Way Dong Woo,
BY Henry L. Hanson
ATTORNEY

Dec. 1, 1964

WAY DONG WOO 3,159,840

PATTERN SENSITIVITY COMPENSATION IN HIGH PULSE DENSITY RECORDING

Filed Nov. 14, 1960

2 Sheets-Sheet 2

INVENTOR:
Way Dong Woo,
BY
Henry L. Hanson
ATTORNEY

United States Patent Office 3,159,840
Patented Dec. 1, 1964

3,159,840

PATTERN SENSITIVITY COMPENSATION IN HIGH PULSE DENSITY RECORDING

Way Dong Woo, Newton Centre, Mass., assignor to Honeywell Inc., a corporation of Delaware Filed Nov. 14, 1960, Ser. No. 69,159
2 Claims. (Cl. 346—74)

This invention relates generally to signal recording and playback systems, and more particularly to new and improved signal recording and playback systems having means to compensate for pattern sensitivity effects in high pulse density signal processing.

In data processing machines, such as electrical computers, telephonic or telegraphic communication systems, and the like, the information frequently is represented in binary form due to the ease with which binary data may be electronically represented by "on-off" or "dot-dash" representations.

When such binary data is recorded in the form of electrical pulses on a record medium, such as a magnetic tape or magnetic drum, the amount of record space required will be dependent upon the number of pulses in the data being processed. In the interests of greater efficiency and economy in the use of such record media, there have been continued efforts in the prior art to increase the pulse density of recording, i.e., to maximize the number of pulses which can intelligibly be recorded on a given amount of space on the record medium.

Those skilled in the high speed pulse recording art appreciate that certain undesirable effects, sometimes known as pattern sensitivity effects, can arise as a result of recording pulses under high density or high pulse packing conditions. Thus, it has been found in the prior art, upon playback of the recorded pulses, that the time position of certain pulses has been shifted relative to other pulses such that the pulse pattern becomes distorted in the recording and playback process and is not a faithful reproduction of the orignal pulse pattern. More specifically, it has been found that each pulse recorded on a magnetic tape record, for example, has a crowding effect upon the immediately adjacent pulses which causes pulse peaks to be moved away from neighboring pulse peaks in areas where no such peaks are present. Manifestly, in high frequency pulse recording, and particularly in time discrimination systems, such a shift of the pulse peaks can be significant and where the length of the pulse is sensed, this pulse shift can lead to serious errors of data processing.

Accordingly, it is a general object of this invention to provide an improved signal processing technique which eliminates the above-described difficulties.

More particularly, it is an object of this invention to provide a new and improved method and means to compensate for pattern sensitivity effects in high pulse density signal processing.

In accordance with the novel features of this invention, these objects are realized by the provision of means for sensing each binary digit representing pulse in a train together with the immediately preceding pulse and the immediately succeeding pulse. The sensing means serves to control the recording of the pulses on a record medium in accordance with the sensed pulse pattern to record each pulse either in phase with a timing or clock signal for the system, or in advanced or delayed relationship to the timing signals to thereby compensate for the pattern sensitivity effects described above.

Thus, in one illustrative embodiment of the invention, the sensing means enables a pulse to be recorded in phase with the timing signals if the pulses before and after a pulse to be recorded both are binary ones or binary zeros. If there is a binary zero before a pulse to be recorded and a binary one after the pulse to be recorded the latter is recorded a delayed amount after the timing signal. If there is a binary one before a pulse to be recorded and a binary zero after a pulse to be recorded, the latter is recorded in advance of the timing signal. The method and means for effecting this technique, as described in detail hereinbelow, serves to greatly improve the accuracy and efficiency of high pulse density recording systems.

It is a further object of this invention to provide a novel method and means for controlling the recording of a pulse on a record medium in accordance with the nature of its neighboring pulses to compensate for pattern sensitivity effects in high pulse density recording.

It is a still further object of this invention to provide high pulse density recording on a record medium by controlling the recording of a pulse relative to a timing signal in response to the sensed nature of its neighboring pulses.

It is another object of this invention to provide a new method and means for high pulse density recording which are characterized by their efficiency and accuracy of operation.

The novel features which are characteristic of the invention are set forth with particularity in the appended claims. The invention itself, however, both as to its organization and method of operation, together with further objects and advantages thereof, will best be understood by reference to the following description taken in conjunction with the accompanying drawings in which:

Figure 5:
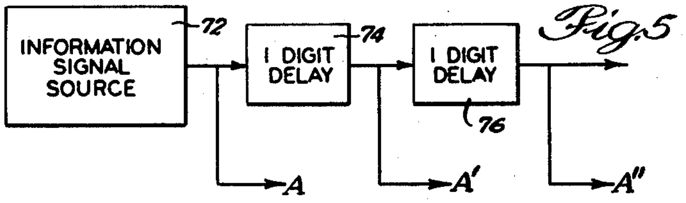
Figure 6:
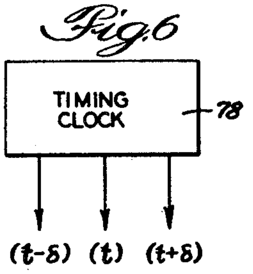
Figures 7, 8:
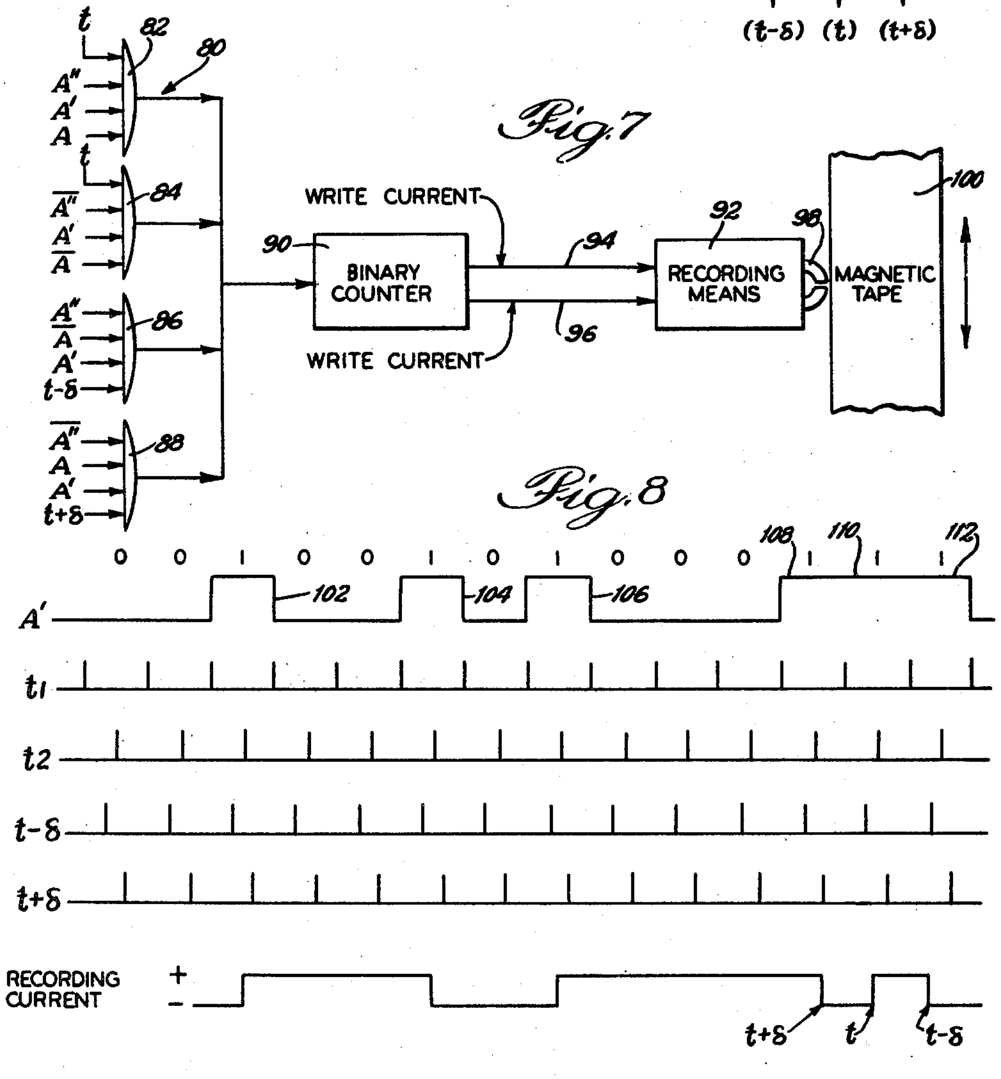

FIGURES 5, 6, and 7 are schematic diagrams of one illustrative circuit embodiment for providing pattern sensitivity compensation in accordance with the invention; and FIGURE 8 illustrates the timing and data pulses present in the illustrative circuit embodiment of FIGURES 5, 6, and 7.

Figures 1, 2, 3, 4:
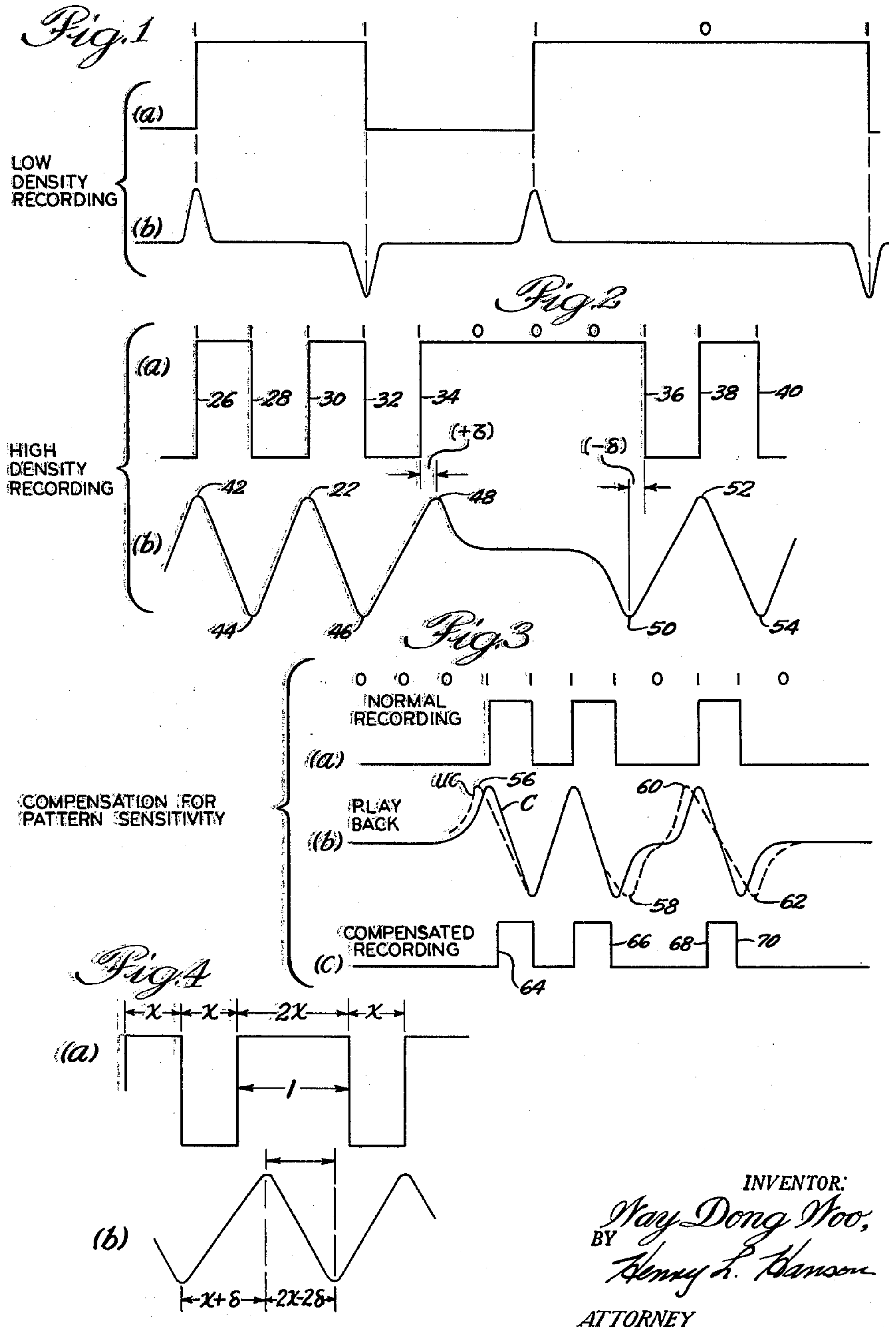
FIGURE 1 illustrates the phase relationship between data pulses, as recorded and played back, under low density recording conditions.
FIGURE 2 illustrates the phase relationship between data pulses, as recorded and played back, under high density recording conditions.
FIGURE 3 illustrates the effects of normal recording and compensated recording of high density data pulses upon the playback of such data pulses.
FIGURE 4 illustrates the significance of pattern sensitivity effects in high pulse density recording systems of the type where the pulse length is measured for data determination.

Referring now to the drawing and more particularly to FIGURE 1, there is illustrated the recording and playback curves normally present in a low density data pulse recording system. As well understood by those skilled in the art, the information data frequently is represented in binary form due to the ease with which binary data may be represented by selecting from two possible signal conditions.

In FIGURE 1(*a*) there is illustrated certain pulse data to be recorded in binary form in which for purposes of illustration, the wave form is changed from one state to the other each time a binary one is to be recorded. Thus, in this example, FIGURE 1(*a*) indicates pulse data representative of the binary number 11101.

In low density pulse recording the recorded signals upon playback normally will have the same phase relationship to each other as the pulse signals initially recorded upon the record medium. This is illustrated in FIGURE 1(*b*) wherein the pulse peaks are representative of the binary number 11101 and have the same phase relationship to each other as the initially recorded pulse data of FIGURE 1(*a*). The phase relationships of the pulse data recorded and played back from the record medium are indicated by the dotted lines between FIGURE 1($a$) and FIGURE 1($b$).

In high density pulse recording, however, certain phase changes may occur in the data pulses played back from the record medium due to the effects of pattern sensitivity. As explained heretofore, in high density or in high packing pulse recording situations, the signal upon playback is a deterioration of the original signal as recorded on the record medium since each pulse will have a crowding effect upon its neighboring pulse such that a pulse peak will be moved away from a neighboring pulse peak into an area where no peaks are present.

This pattern sensitivity effect of high density pulse recording is illustrated in FIGURES 2($a$) and 2($b$) which represent respectively the pulse data to be recorded and the pulse data as it appears upon playback from the record medium. In FIGURE 2($a$) the pulse data to be recorded is representative of the binary number 11111000111 as indicated by a change of direction in the wave form each time a binary one occurs in the number. In this case, the pattern sensitivity effect which is present in high density pulse recording serves to deteriorate or distort the signal wave form upon playback in the manner illustrated in FIGURE 2($b$). Thus, the pulse peak which corresponds to the first change in the binary number from a one to a zero does not occur at the same relative time as this digit change in the pulse wave form to be recorded in FIGURE 2($a$). Rather, the pulse peak is shown as occurring a delayed period of time ($t+\delta$) after the time when this pulse peak would have occurred in the absence of pattern sensitivity effect. Similarly, when the binary number first changes from a zero to a one, the pulse peak in the playback signal occurs a period of time ($t-\delta$) in advance of the time when this peak would have occurred in the absence of pattern sensitivity effect.

Thus, those skilled in the art will appreciate that the crowding effect of neighboring pulse peaks causes some peaks to be early and some peaks to be late depending upon the nature of the neighboring signal pulses. In accordance with this invention, the rules for providing compensation for the effects of pattern sensitivity may be stated as follows:

(1) If there is a binary one before the pulse and a binary one after the pulse, the switching time is normal and there will be no shift of the pulse upon playback. Thus, no compensation is necessary.

(2) If there is a binary zero before the pulse and a binary zero after the pulse, the switching time will be normal and there will be no shifting of the pulse upon playback. Thus, no compensation is necessary.

(3) If there is a binary zero before the pulse and a binary one after the pulse, the pulse upon playback will be advanced for the time period ($\delta$) to cause a shift of the pulse from its original time relationship in the binary number. Compensation is provided by sensing this condition and by delaying the recording of the pulse by the time period ($\delta$).

(4) If there is a binary one before the pulse and a binary zero after the pulse, the pulse upon playback will be delayed for the time period ($\delta$) to cause a shift of the pulse upon playback from its original time relationship in the binary number. Compensation is provided by sensing this condition and by advancing the recording of the pulse by the time period ($\delta$).

The effects of pattern sensitivity on a pulse wave form in a high density recording system are illustrated in FIGURE 2 of the drawing. Thus, it can be seen that no pulse shift occurs when each of the neighboring pulses are equal to binary zero or binary one. This is shown at the pulses designated 26, 28, 30, 32, 38 and 40 of FIGURE 2($a$) together with the corresponding pulse peaks 42, 44, 22, and 46, 52 and 54 of FIGURE 2($b$). When the preceding pulse is a binary one and the succeeding pulse is a binary zero, as at 34 and 48, the playback of the pulse is delayed for the time period ($\delta$). When the pulse is preceded by a binary zero and the subsequent pulse is a binary one, at at 36 and 50, the playback of the pulse is advanced the time period ($\delta$), as indicated in FIGURE 2($b$).

In accordance with a feature of this invention, this pattern sensitivity effect is compensated by the provision of unique circuitry which serves to sense the preceding and succeeding pulses of each pulse to be recorded to determine if an advance or delay in the recording of the pulse is required to compensate for the phase shift in the opposite direction effected as a result of pattern sensitivity.

FIGURE 3 of the drawing illustrates the differences between the pulses when played back under normal recording conditions and when played back under compensated recording conditions in accordance with the invention. In this example, the binary pulse data to be recorded is indicative of the binary number 00011110110. The normal recording of this binary number is illustrated in FIGURE 3($a$) wherein the signal waveform changes direction each time a binary one is to be recorded. The dotted line UC shown in FIGURE 3($b$) of the drawing represents the signal curve upon playback where no compensation is provided for pattern sensitivity effect. It can there be seen that the pulse peak 56 is shifted an advanced amount ($\delta$), the pulse peak 58 is shifted a delayed amount ($\delta$), the pulse peak 60 is shifted an advanced amount ($\delta$) and the pulse peak 62 is shifted a delayed amount ($\delta$), all with respect to the phase relationships present in the initial signal to be recorded.

In accordance with a feature of this invention, if the pulses to be recorded are shifted or delayed in a direction opposite to the phase shifts resulting from pattern sensitivity, the latter will be compensated and the resultant signal upon playback will have the form indicated by the solid line curve C of FIGURE 3($b$). This compensated recording is shown in FIGURE 3($c$) of the drawing wherein the binary one pulse 64 to be recorded is delayed by the shift ($\delta$), the binary one pulse 66 to be recorded is advanced by the shift ($\delta$), the binary one pulse 68 is delayed by the shift ($\delta$), and the binary one pulse 70 is advanced by the shift ($\delta$).

Since the compensating phase shifts provided before the recording of the pulses is directly opposite to the pattern sensitivity effect, the latter is cancelled with the result that this signal wave form upon playback—as indicated in FIGURE 3($b$) by the curve C—has the same phase relationships as the initial signal information.

The significance of pattern sensitivity effects in high density pulse systems of the time discrimination type is illustrated in FIGURE 4 of the drawing. Since the lengths of the signal pulses are measured in such systems to determine the information carried by the signals, any shift of the pulses to change such pulse length could result in serious errors in the analysis of the information carried by the signals. FIGURE 4($a$) represents a signal having the pulse lengths ($x$), ($x$), ($2x$), and ($x$), respectively. When pattern sensitivity effects are present to shift the length of the pulses upon playback, as illustrated in FIGURE 4($b$), it can be seen that the length of one signal pulse is stretched to ($x+\delta$); while the length of the next pulse is shortened to ($x-\delta$).

Manifestly, this shifting of the pulse length due to pattern sensitivity effect could result in completely erroneous information being processed and would be intolerable in many situations where time discrimination systems presently are being used for data processing functions.

One illustrative circuit embodiment for effecting pattern sensitivity compensation in accordance with the invention is shown in FIGURES 5, 6 and 7 of the drawing. FIGURE 5 comprises an information signal source 72 having an output which is connected to a serial delay line formed of the cascaded one digit delay devices 74 and 76, respectively.

The information signal source 72 may take the form of any suitable data processing apparatus which supplies information signals in binary pulse form. Advantageously, the information source 72 takes the form of a data processing apparatus of the time discrimination type, such as may be used in computing apparatus, telephonic apparatus, telegraphic apparatus, or the like. The data pulse output of the information signal source 72 is in a form suitable to be recorded on a record medium, such as a magnetic tape or drum, for storage thereon prior to a further data processing operation.

The data pulse output from the information signal source 72 is applied directly to the output lead A. For illustrative purposes, and to further explain the operation of the invention, this data pulse output A is shown in FIGURE 8 as the binary number 00100101000111, wherein a binary one is represented by a positive pulse and a binary zero being represented by the absence of a positive pulse.

The data pulse output of the information signal source 72 also is applied to the one digit delay device 74, the output of which in turn is applied to the one digit delay device 76. Accordingly, those skilled in the art will appreciate that the output of one digit delay device 74 at the output lead A′ will be similar to the signal output on the lead A with the exception that each binary digit will be delayed for one pulse period.

It also will be appreciated that the output of the one digit delay device 76 at the output A″ will be similar to the signal output on lead A with the exception that each binary digit in the signal will be delayed two pulse periods with respect to the signal output of the information signal source 72. The one digit delay devices 74 and 76 may take any suitable form of delay device known in the art, as for example, a counting chain, a delay line, a rotating drum, or the like.

A timing clock is shown in FIGURE 6 of the drawing and three output leads are provided from the timing clock to enable timing pulses ($t$), advanced timing pulses ($t-\delta$), and delayed timing pulses ($t+\delta$) to be applied to the logic circuit described hereinbelow. The details of the timing clock are not shown since timing clocks are well known in the art and may comprise, for example, an oscillator ring, a counting chain, a tapped delay line, and the like.

The output of the timing clock 78 is shown in FIGURE 8 of the drawing at ($t$) which represents the normal timing pulses applied to the data processing system, at ($t-\delta$) which represents pulses advanced in time from the timing pulses $t$, and at ($t+\delta$) which represents timing pulses delayed in time from the timing pulses $t$.

The output signals from the data pulse lines A, A′, A″, and the output timing pulses from the timing clock 78 are applied to a logic circuit indicated generally at 80 in FIGURE 7 of the drawing. The logic circuit 80, in this illustrative embodiment comprises four coincidence or AND logic circuits, symbolically shown at 82, 84, 86 and 88, respectively. Each AND circuit is provided with four input leads, and in accordance with the well-known operation of such AND circuits, an output signal is provided from such a circuit only when there is a coincidence of signals on each of the input lines connected thereto.

Thus the AND circuit 82 is provided with an input lead $t$ from the timing clock 78, an input lead A″ from the delay device 76, an input lead A′ from the delay device 74, and input lead A from the information signal source 72.

The AND circuit 84 is provided with an input lead t from the timing clock 78, an input lead $\overline{A}''$ which is activated only when a signal is not present at the output of the delay device 76, an input lead A′ from the delay device 74, and an input lead $\overline{A}$ which is activated only when a signal pulse is not present at the output of the signal pulse 72.

The AND circuit 86 is provided with input lead A″ from the delay device 76, an input lead $\overline{A}$ which is activated only when a signal pulse is not present at the output of the signal source 72, an input lead A′ from the delay device 74, and an input lead ($t-\delta$) from the timing clock 78.

The AND circuit 88 is provided with the input lead $\overline{A}''$ which indicates that this lead is activated only when a data pulse is not present at the output of the delay device 76, an input lead A from the signal source 72, an input lead A′ from the delay device 74, and the input lead ($t-\delta$) from the timing clock 78.

Due to the different combinations of inputs to the four logic AND circuits, one and only one of such AND circuits will be activated to pass a pulse at any particular time, and this operation will be dependent upon the nature of the signal pulse to be recorded together with the sensed nature of its immediately preceding and succeeding neighboring pulses. The AND circuits function in accordance with the four rules of compensation explained hereinabove, wherein the outputs of circuits 82 and 84 comprise a pulse in phase with the timing pulse ($t$), the output of circuit 86 comprises an advanced pulse in phase with the timing pulse ($t-\delta$) and the output of circuit 88 comprises a delayed pulse in phase with the timing pulse ($t+\delta$).

The output of the logic circuit 80 is applied to a binary counter which may take the form of any suitable circuit having two stable states of operation, such as a binary flip-flop. Each input pulse to the binary counter 90 from the logic circuit 80 causes the binary counter 90 to shift from one stable state to the other, thereby to change the output current to the recording means 92 by alternately activating the write current leads 94 and 96. The recording means 92 may be a conventional magnetic transducer head energizing circuit which serves to energize the magnetic transducer head 98 to record the information pulses on the magnetic tape 100.

In the operation of the pattern sensitivity compensation circuits of FIGURES 5, 6, and 7, each signal pulse from the information signal source 72 is sensed together with its immediately preceding and immediately succeeding signal pulses to determine whether the pulse to be recorded shall be recorded in phase with the timing pulse ($t$) or advanced to be in phase with the timing pulse ($t-\delta$) or delayed to be in phase with the timing pulse ($t+\delta$). This is graphically illustrated in FIGURE 8, at the bottom line entitled Recording Current, which illustrates the writing current signal applied to the magnetic head 98 by the recording means 92 in response to the condition of the binary counter 90. The wave forms identified by $t1$ and $t2$ in FIGURE 8 are timing pulses for the information signal source and for the signal sensing and recording means, respectively. Thus, the signals from the information signal source are referenced to the $t1$ timing signals and change at $t1$ time periods, while the sensing and recording means are referenced to the $t2$ timing signals and the recorded signals change at the $t2$ time periods, either in phase, advanced or delayed, as necessary.

Thus, the first binary one pulse 102 of the signal wave form A′ in FIGURE 8 is immediately preceded and followed by a binary zero pulse. Since there will be no shifting of the pulse 102 upon playback under this condition, the recording current for pulse 102, as controlled by the activation of logic circuit 84, is in phase with the timing pulses ($t$).

The second binary one pulse 104 of line A′ in FIGURE 8 also will be recorded in phase with the timing pulses ($t$) since each of its neighboring pulses are binary zeroes to activate logic circuit 84. The same is true of the third binary one pulse 106 at line A′ of FIGURE 8.

The fourth binary one pulse 108 at line A′ of FIG-

URE 8 is immediately preceded by a binary zero pulse and is immediately succeeded by a binary one pulse 110. Since the pattern sensitivity effect upon the playback of this pulse would cause it to be advanced, or shifted towards the binary zero, the circuit operates to delay the recording of this pulse to compensate for such a phase shift. Thus, as shown in the recording current curve of FIGURE 8 the binary one pulse 108 is recorded in phase with the timing pulse $(t+\delta)$, a delayed amount after the time pulse $(t)$, due to the activation of the logic circuit 88.

The binary one pulse 110 at line A' of FIGURE 8 has a binary one pulse at each side thereof, and therefore, it is recorded in phase with the timing pulses $(t)$ with no advanced or delayed phase shifting being necessary. This is effected by the activation of the logic circuit 82.

The binary one pulse 112 at line A' of FIGURE 8 has a binary one pulse immediately preceding this pulse and a binary zero immediately following it. Since the pattern sensitivity effect would serve to delay this pulse upon playback, the compensation circuit of the invention serves to advance the recording of pulse 112 to compensate for such a phase shift. Thus, as shown on the recording current line of FIGURE 8, the binary one pulse 112 is recorded in phase with the $(t-\delta)$ timing signal as a result of the activation of logic circuit 86. Thus, it can be seen that the compensating circuit of the invention serves to fully compensate for all pattern sensitivity effects to correct the phasing or timing of the recorded signal pulses in high pulse density pulse systems, thereby providing correct and accurate pulse data processing.

While there has been shown and described a specific embodiment of the present invention, it will, of course, be understood that various modifications and alternative constructions may be made without departing from the true spirit and scope of the invention. Therefore, it is intended by the appended claims to cover all such modifications and alternative constructions as fall within their true spirit and scope.

What is claimed as the invention is:

1. The improvement of pulse data processing apparatus for recording binary digit pulses comprising a record medium upon which binary digit pulses are to be recorded, a source of electrical signals representative of the binary digit pulses to be recorded, a source of timing pulses having an output of in-phase timing pulses, advanced timing pulses and delayed timing pulses, logic sensing means adapted to receive said binary digit pulses and said timing pulses, means for simultaneously applying a group of said binary digit pulses from said source to said logic sensing means, said group being comprised of a binary digit pulse, its immediately preceding binary digit pulse and its immediately succeeding binary digit pulse, means for simultaneously applying said in-phase timing pulses, said advanced timing pulses and said delayed timing pulses to said logic sensing means at the same time said group of binary digit pulses is applied to said logic sensing means, and recording control means connected to the output of said logic sensing means to record each of the sensed binary digit pulses upon said record medium in synchronism with said in-phase timing pulses, said advanced timing pulses, or said delayed timing pulses as determined by the output of said logic sensing means.

2. The improvement of pulse data processing apparatus having means to compensate for pattern sensitivity effects in high pulse density recording comprising a record medium upon which binary digit pulses are to be recorded, a source of eletrical signals representative of the binary one or zero digit pulses to be recorded, a source of timing pulses having an output of in-phase timing pulses, advanced timing pulses and delayed timing pulses, logic sensing means adapted to receive said binary digit pulses and said timing pulses, means for simultaneously applying a group of said binary digit pulses from said source to said logic sensing means, said group being comprised of a binary digit pulse, its immediately preceding binary digit pulse and its immediately succeeding binary digit pulse, means for simultaneously applying said in-phase timing pulses, said advanced timing pulses and said delayed timing pulses to said logic sensing means at the same time said group of binary digit pulses is applied to said logic sensing means, said logic sensing means including a plurality of logic gates having a first output when said preceding and succeeding digit pulses have the same binary digit value, a second output when the preceding digit pulse is a binary one and the succeeding digit pulse is a binary zero, and a third output when the preceding digit pulse is a binary zero and the succeeding digit pulse is a binary one, and recording control means connected to the output of said logic sensing means to record each of the sensed binary digit pulses upon said record medium in synchronism with said in-phase timing pulses, said advanced timing pulses, or said delayed timing pulses as determined by the output of said logic sensing means.

References Cited in the file of this patent

UNITED STATES PATENTS

| | | |
|---|---|---|
| 2,764,463 | Lubkin et al. | Sept. 25, 1956 |
| 2,890,440 | Burkhart | June 9, 1959 |
| 2,896,192 | Husman | July 21, 1959 |
| 2,948,884 | Guerber et al. | Aug. 9, 1960 |
| 3,067,422 | Hunt | Dec. 4, 1962 |